Sept. 18, 1934.    W. H. EDWARDS    1,974,376
VEHICLE CAB
Filed Dec. 19, 1933    4 Sheets-Sheet 1

INVENTOR.
William Howard Edwards
BY
P. W. Pomeroy
ATTORNEYS.

Sept. 18, 1934.　　　W. H. EDWARDS　　　1,974,376
VEHICLE CAB
Filed Dec. 19, 1933　　　4 Sheets-Sheet 2

INVENTOR.
William Howard Edwards
BY
ATTORNEYS.

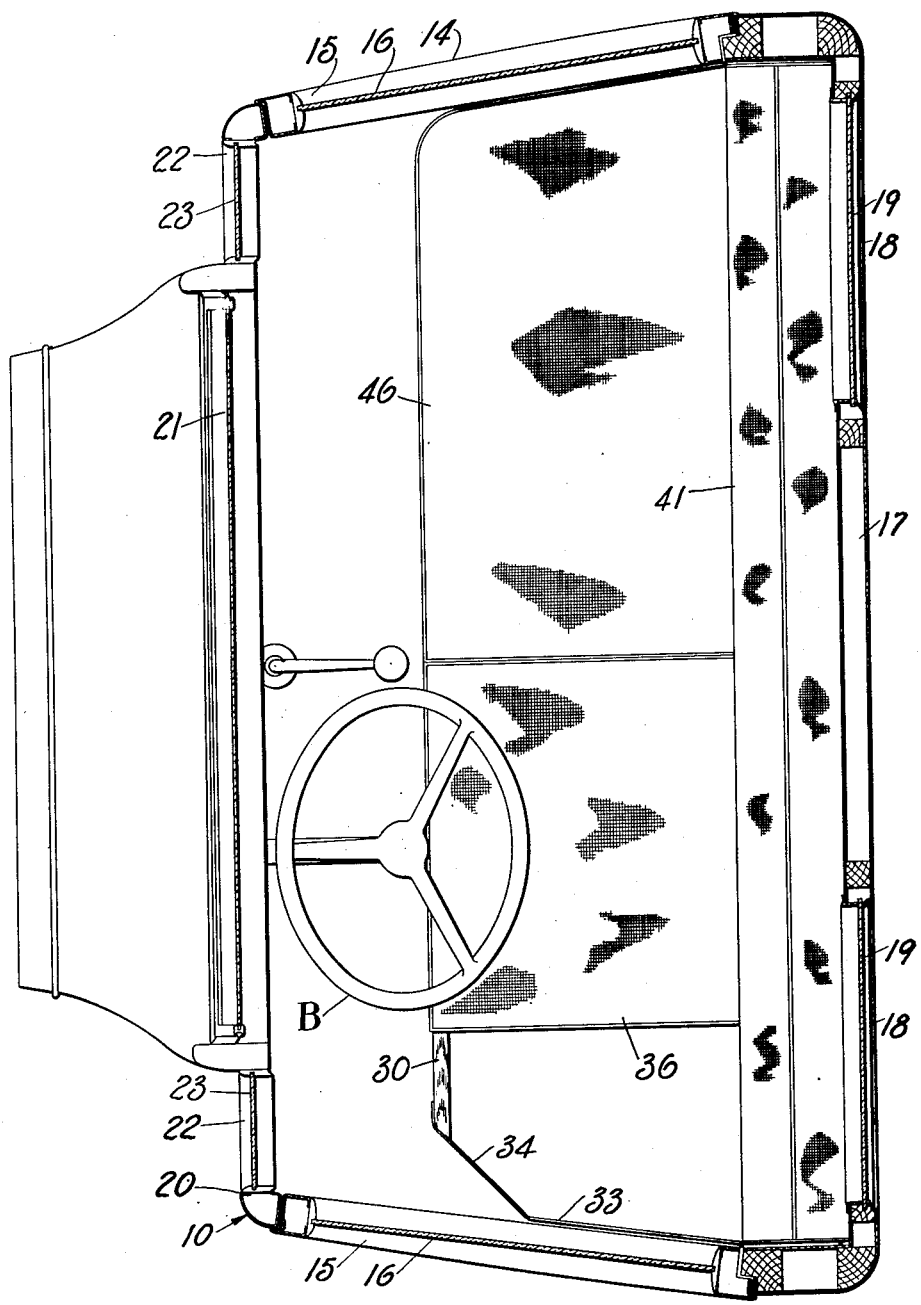

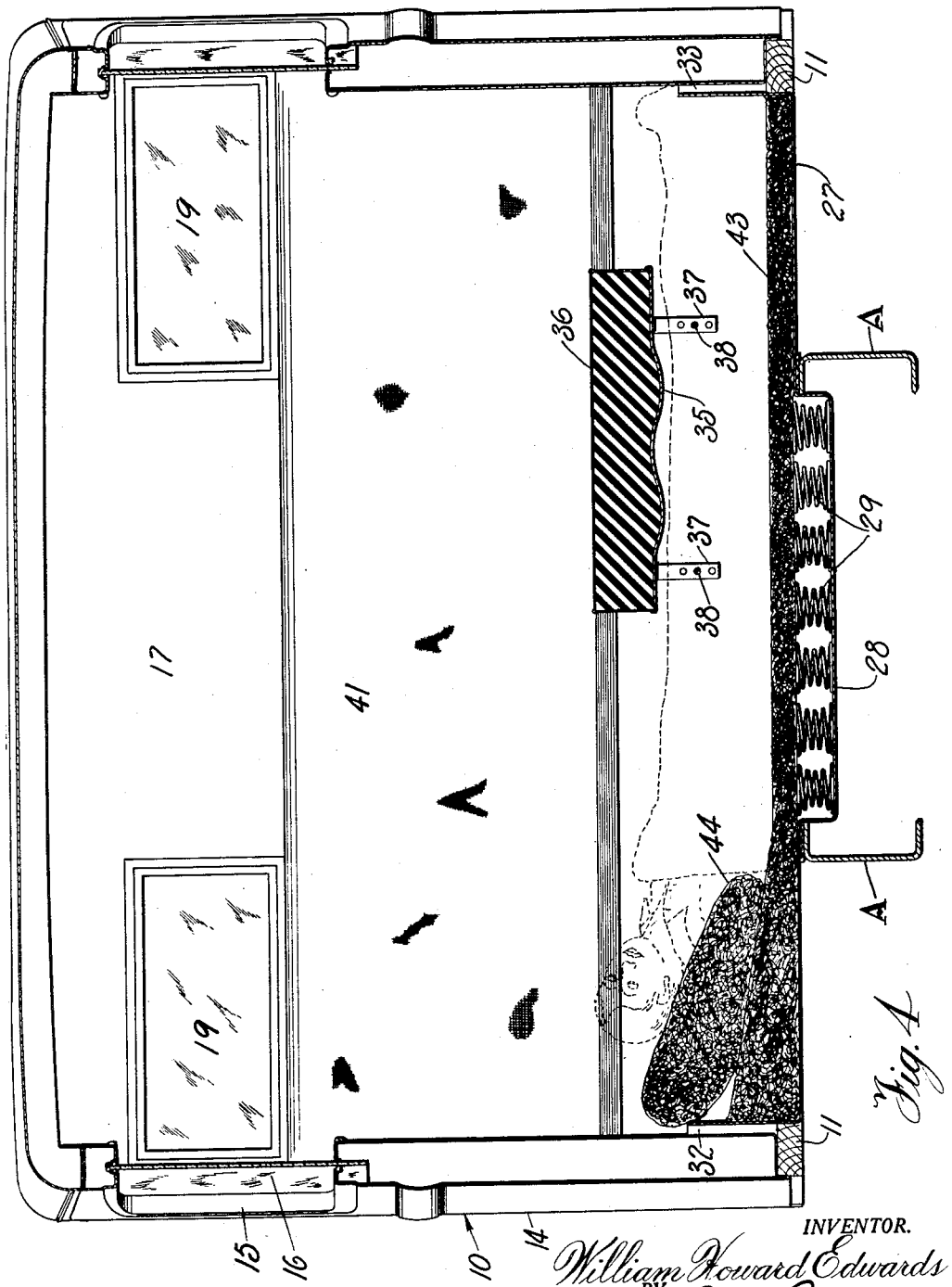

Patented Sept. 18, 1934

1,974,376

UNITED STATES PATENT OFFICE

1,974,376

VEHICLE CAB

William Howard Edwards, South Bend, Ind., assignor to Edwards Iron Works, Incorporated, South Bend, Ind., a corporation of Indiana Application December 19, 1933, Serial No. 703,121

12 Claims. (Cl. 155—7)

This invention relates to cabs for use on vehicles, as for example, trucks, tractors and the like, and particularly to sleeper cabs for use on such vehicles.

The principal object of my invention is to provide a cab including a sleeping compartment therein which requires no more longitudinal space on the vehicle chassis than cabs having only the conventional seat for the driver and his attendant.

A further object is to provide a cab having a floor therein which also forms the floor for the sleeping compartment, the driver's seat being positioned above the sleeping compartment.

A still further object is to provide a cab in which the floor and the rear wall thereof form two of the walls of the sleeping compartment.

A further object is to provide a cab having a sleeping compartment and a driver's seat above the same, the sleeping compartment being adapted to form a support for a seat portion, thus providing additional seating space at the option of the occupants of the vehicle.

Another object is to provide a cab having a sleeping compartment beneath the driver's seat adapted for use when the vehicle is in motion, and means for also providing an upper berth for use when the vehicle is standing still.

Another object is to provide a cab having upper and lower berths and a driver's seat intermediate the berths.

Another object is to provide a cab having a seat therein formed in sections, one of the seat sections being adapted to be removed from its normal seating position, to provide a shield for a sleeping compartment positioned between the floor of the cab and the driver's seat.

Still another object is to provide a cab provided with a floor having an offset portion adapted to extend between the side rails of the chassis frame, the offset portion being adapted to receive springs, and a mattress extending over the floor and springs for use as a bed.

The above being among some of the objects of the invention, the same further resides in certain details of construction, methods of manufacture, and arrangement of parts, which will be apparent from the detailed description to follow.

Heretofore when it was desired to provide sleeping accommodations in cabs for trucks, tractors and the like, sleeping space was provided at the rear of the driver's seat. In some cases the sleeping compartment was built exteriorly of the cab as upon the roof of the same. In the cabs where the sleeping compartment was provided at the rear of the driver's seat, the cab extended rearwardly on the chassis of the vehicle from 24 to 30 inches farther than the conventional cab known in the trade as "standard" or "two-man" cabs. Such sleeper cabs had several disadvantages, one of which was that the cab required so much space on the vehicle that much of the valuable space was lost for the carrying of goods. In other words, a truck having a predetermined load carrying capacity had to be lengthened from 24 to 30 inches when it was desired to use a sleeper cab thereon. In many cases it was not practical or desirable to lengthen the chassis frame to accommodate the sleeper cab with the result that the owner had to resort to the use of a tractor or power unit and a trailer attached thereto in order to provide sufficient floor space to meet the load carrying requirements.

In those constructions having the sleeping compartment on top of the cab, the same did not meet with commercial success because of the inaccessibility of the sleeping compartment, and furthermore, due to the weaving of the vehicle when the same was in motion, the occupant of the sleeping compartment did not have a comfortable berth so that he could obtain the required rest and relaxation.

In my present invention, I have provided a cab which requires no more space longitudinally of the vehicle than the conventional "standard" or "two-man" cab but in which I have provided a comfortable sleeping compartment which may be used by one of the attendants while the truck is being driven from place to place. Furthermore, by my improved construction it is possible to provide sleeper cabs on trucks having a relatively short wheel base and yet which will have ample floor space for hauling large loads for a long distance. It is also evident that my improved construction permits of the use of sleeper cabs on trucks which heretofore would be unsuitable for such installation and that by such use the single truck may be substituted for the trailer and tractor combination, the latter being much more expensive both in initial cost and in up-keep.

Having pointed out some of the objects and advantages of my invention, the same will now be described more in detail.

In the drawings in which like numerals refer to like parts throughout the several views, Fig. 1 is a longitudinal sectional view through the cab taken on the line 1—1 of Fig. 2.

Fig. 3 is a view similar to Fig. 2, showing the seat over the sleeping compartment in position for the accommodation of passengers.

Fig. 4 is a transverse sectional view taken on the line 4—4 of Fig. 2, showing further details of the cab, its mounting on the chassis frame, and the sleeping compartment.

Figure 1:
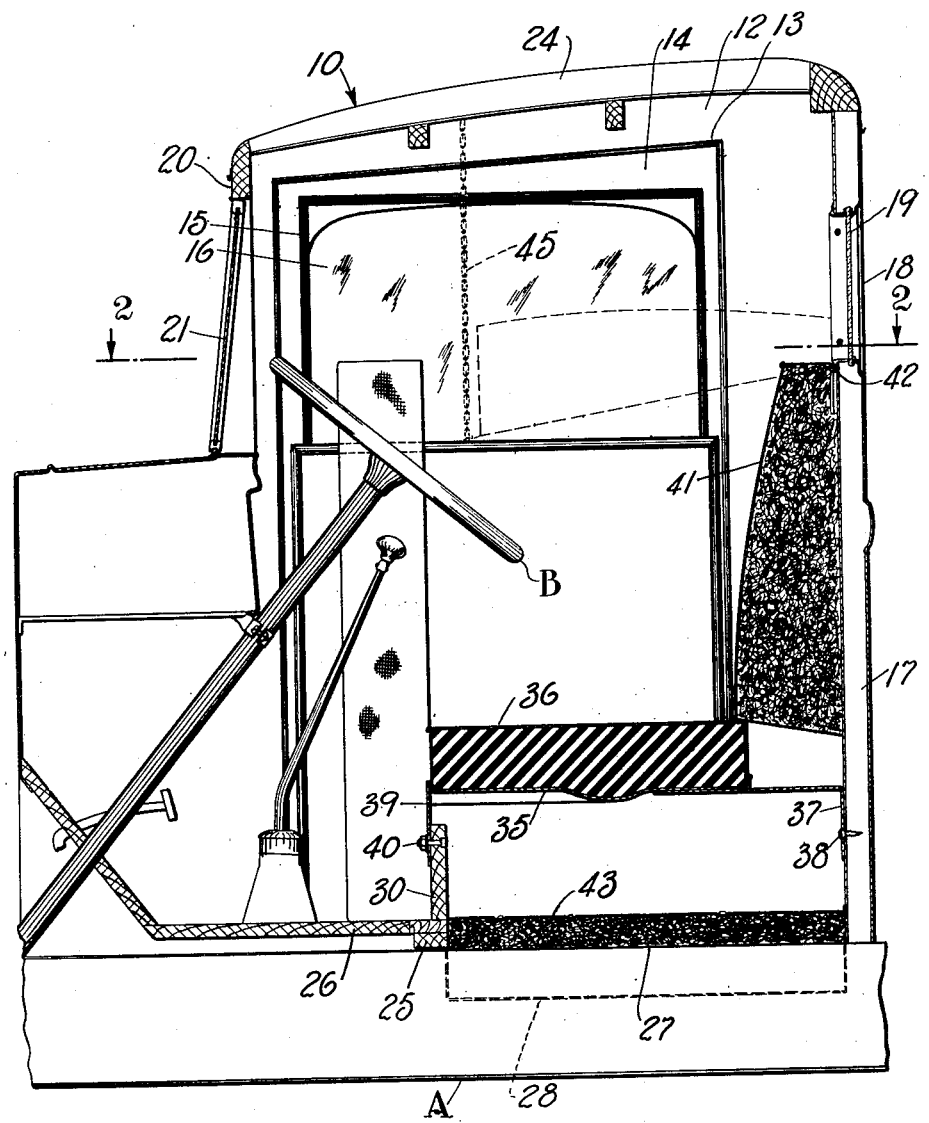

Referring to the drawings in detail, I have shown a cab indicated generally by the numeral 10 and having sills 11; side walls 12 provided with openings 13 therein to receive the doors 14 preferably provided with openings 15 in which are slidably mounted glass closures 16; a rear wall or partition 17 having openings 18 therein in which are mounted in any suitable manner windows 19; a front 20, having a swinging windshield 21 mounted therein at opposite sides of which are openings 22 provided with glass closures 23 which may be moved to opened or ventilated position if so desired; and a top 24 constructed with suitable header bars, cross bars and covering. The cab is also provided with cross sills 25 and a floor 26 in front of the driver's seat and sleeping compartment presently to be described.

While cabs including my invention may have utility on vehicles traveling in the air, on water, or on land, I have illustrated the same as being supported upon the chassis frame of an automotive vehicle such as a tractor or a truck, the details of which have not been illustrated, except for the chassis side frame members A.

Forwardly of the cab rear wall 17 are floor portions 27 which extend outwardly from the chassis frame members A and are connected with the sills 11. These floor portions 27 are preferably at a lower level than the floor 26 in order to provide greater height between the floor and driver's seat presently to be described. The floor intermediate the frame side members A is preferably offset at 28 to form a pan for the accommodation of the springs 29, as is clearly illustrated in Fig. 4. Positioned upon the floor 26 above the cross sills 25 is a partition or wall 30 which extends substantially the full width of the cab. I have provided a head board 31, preferably of sheet metal, which preferably is curved at its forward end 32 and is secured to the partition 30 and which extends rearwardly therefrom and is connected with the respective cab side wall 12 adjacent to the rear wall 17 or to the rear wall. I also provide a foot board 33, preferably formed of sheet metal, which is similar to the head board 31 and secured in the same manner, except that I prefer to substitute the angle portion 34 for the curved portion 32. By constructing the foot board in the manner shown, easier ingress and egress to the cab through the left door 14 is permitted, without reducing appreciably the foot space for the occupant of the sleeping compartment.

Immediately back of the steering wheel B is a driver's seat preferably formed of a sheet metal pan 35 shaped to conform with the hips of the driver when in seated position and on which is mounted a rubber pad 36. The pan 35 is mounted at its rear on brackets 37 adjustably secured to the rear wall 17 by the screws 38. Extending downwardly from the pan 35 to the front edge thereof are brackets 39 adjustably secured to the wall 30 by bolts 40. It will thus be seen that the driver's seat can be raised and lowered by removing the screws 38 and the bolts 40 so that the seat can be adjusted to the desired elevation for the comfort of the driver of the vehicle.

A back 41 extending substantially the full width of the cab is preferably hinged at 42 at its upper edge to the rear wall 17, the same normally being in the position shown in Fig. 1 to provide a rest for the driver of the vehicle and other persons sitting aside of him.

From the above description, it will be seen that a sleeping compartment or berth having a floor 27 provided with the offset 28 therein to receive the springs 29, and having a front wall 30, a head rest 31, a foot rest 32 and a rear wall formed by the rear wall of the cab 17, is provided beneath the driver's seat 35. For the comfort of the occupant of the berth, I preferably provide a mattress 43 which covers the entire floor 27 and which may have an enlarged or sloping portion at the head of the berth and also with a pillow 44 if so desired. There is ample room in the berth for the occupant thereof to lie flat upon his back or on either side without in any way disturbing the driver of the vehicle, nor will the movements of the driver of the vehicle in any way disturb the person using the sleeping compartment.

Figure 2:
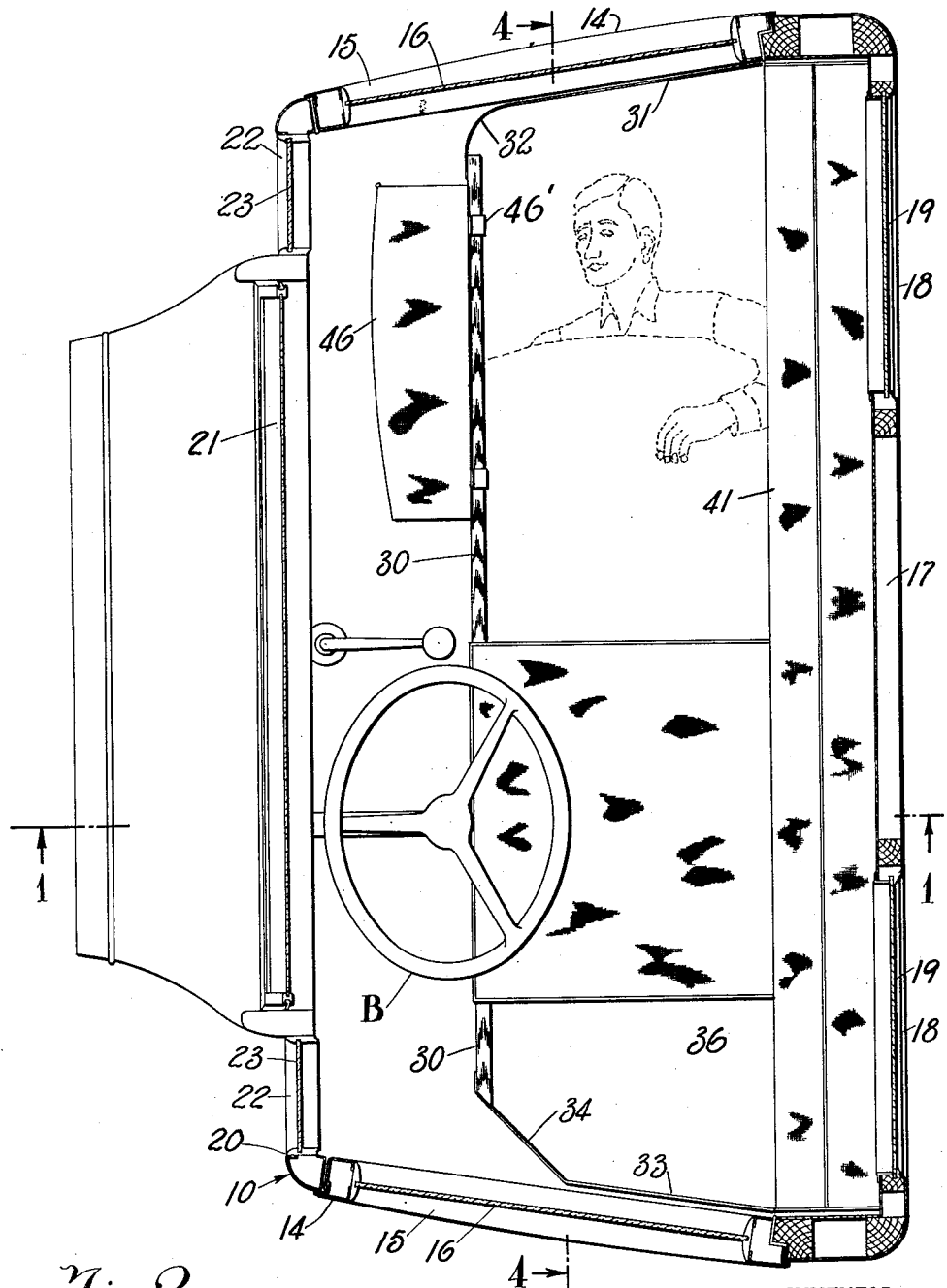
Fig. 2 is a detailed sectional view looking downwardly on the sleeping compartment and taken on the line 2—2 of Fig. 1.

Oftentimes trucks provided with sleeper cabs travel for long distances and in some cases it is desirable to provide additional sleeping quarters so I have made arrangements for an upper as well as a lower berth. When it is desired to provide an upper berth, the back 41 may be swung to the position shown in dotted lines in Fig. 1 and maintained in that position by chains 45 or other suitable supporting means extending from the roof 24. The back 41 may be swung to the berth forming position without removing or disturbing the seat pan 35 although it will be apparent that when the upper berth is in use the driver has moved from his seat. The seat portion 46 is provided with hooks 46' on the bottom thereof so that when one of the occupants of the vehicle desires to retire, the seat may be removed from the position shown in Fig. 3 and hooked over the wall 30 as shown in Fig. 2 in which position the seat 46 provides a shield so that any fumes from the engine or dust or dirt which might come into the driver's compartment, as for example, through the windshield opening or through the openings 22, will not be blown directly across the face of the person in the sleeping compartment. As stated above, the windows 23 in the front of the cab may be moved to ventilating position so it will also be seen from an inspection of Fig. 2 that the seat 46 when in its upright position will prevent the wind from blowing directly on the face of the occupant and yet at the same time affording proper ventilation in the cab.

While I have shown and described one modification of my invention, it will be apparent to those skilled in the art that various changes can be made and changes in details of construction without departing from the spirit and substance of my invention, the scope of which is to be measured entirely by the sub-joined claims.

What I claim is:

1. A vehicle cab comprising a floor having an offset portion therein, springs supported in said offset portion, a covering for said springs and floor, and walls forwardly and rearwardly of said floor, said walls and floor forming a berth.

2. A vehicle cab comprising a floor having an offset portion therein, springs supported in said offset portion, a covering for said springs and floor, walls forwardly and rearwardly of said floor, said walls and floor forming a berth, and a driver's seat above said berth.

3. A vehicle cab comprising, a front, side and rear walls, a floor having an offset therein, springs supported in said offset portion, a covering for said springs and floor, a partition extending transversely of said cab forwardly of said floor, head and foot boards secured to said partition extending rearwardly therefrom, said floor, partition, head and foot boards, and rear wall forming a berth, and a driver's seat above said berth.

4. A vehicle cab comprising, a front, side and rear walls, a floor, a partition extending transversely of said cab forwardly of said rear wall, said partition, floor, and rear wall forming a berth, a driver's seat above said berth, and a shield for said berth formed by a seat portion.

5. A vehicle cab comprising a front, side and rear walls, a floor, and a partition extending transversely of said cab forwardly of said rear wall, said partition, floor, and rear wall forming a berth compartment of a size to accommodate an adult person, said compartment being at least partially open at its top.

6. A vehicle cab comprising a front, side and rear walls, a floor, a partition extending transversely of said cab forwardly of said rear wall, said partition, floor, and rear wall forming a berth compartment of a size to accommodate an adult person, and a seat above said berth which is of less width than the length of the berth compartment.

7. A vehicle cab comprising a front, side and rear walls, a floor, a partition extending transversely of said cab forwardly of said rear wall, and head and foot boards secured to said partition extending rearwardly therefrom, said partition, head and foot boards, floor and rear wall forming a berth compartment of a size to accommodate an adult person, said compartment being at least partially open at its top.

8. A vehicle cab comprising a front, side and rear walls, a floor, a partition extending transversely of said cab forwardly of said rear wall, head and foot boards secured to said partition extending rearwardly therefrom, said partition, head and foot boards, floor and rear wall forming a berth compartment of a size to accommodate an adult person, and a seat above said berth which is of less width than the length of the berth compartment.

9. A vehicle cab comprising a substantially vertical rear wall, a floor, a partition forwardly of said rear wall, head and foot boards secured to said partition operatively connected to said rear wall, said rear wall, floor, partition, and head and foot boards forming a berth compartment of a size to accommodate an adult person, and a seat supported by said rear wall and partition above said berth and being of less width than the length of the berth compartment.

10. A vehicle cab comprising a front, side and rear walls, a floor, a partition extending transversely of the cab forwardly of said rear wall, said partition, floor, and rear wall forming a berth compartment of a size to accommodate an adult person, a seat positioned above said berth and being of a size to cover a portion only of the top of the berth, and an additional seat unit constructed and arranged to be positioned above the berth to close an additional portion of the top of the berth when the latter is not in use, said additional seat unit being removable to permit the compartment to be used as a berth.

11. A vehicle cab comprising a front, side and rear walls, a floor, a partition extending transversely of the cab forwardly of said rear wall, said partition, floor, and rear wall forming a berth compartment of a size to accommodate an adult person, a seat positioned above said berth and being of a size to cover a portion only of the top of the berth, an additional seat unit constructed and arranged to be positioned above the berth to close an additional portion of the top of the berth when the latter is not in use, said additional seat unit being removable to permit the compartment to be used as a berth, and means for securing the auxiliary seat unit to said partition to cause said unit to act as a shield for said berth.

12. A vehicle cab comprising a substantially vertical rear wall, a floor, a partition forwardly of said rear wall, head and foot boards secured to said partition operatively connected with said rear wall, said rear wall, floor, partition, and head and foot boards forming a berth compartment of a size to accommodate an adult person, and a seat above and covering only a portion of said berth compartment supported by said rear wall and partition intermediate the ends of said berth.

WILLIAM HOWARD EDWARDS.